United States Patent [19]
Motose et al.

[11] Patent Number: 5,345,903
[45] Date of Patent: Sep. 13, 1994

[54] ENGINE STOP CONTROL DEVICE

[75] Inventors: Hitoshi Motose; Hidetoshi Ishigami, both of Hamamatsu, Japan

[73] Assignee: Sanshin Kogyo Kabushiki Kaisha, Hamamatsu, Japan

[21] Appl. No.: 144,750

[22] Filed: Oct. 27, 1993

[30] Foreign Application Priority Data

Oct. 27, 1992 [JP] Japan ................................ 4-310826

[51] Int. Cl.⁵ ............................................ F02B 77/00
[52] U.S. Cl. ......................... 123/198 DC; 123/198 D
[58] Field of Search .... 123/198 D, 198 DC, 198 DB, 123/73 C

[56] References Cited
U.S. PATENT DOCUMENTS
5,191,531 3/1993 Kuroso et al. ............... 123/73 C Primary Examiner—Noah P. Kamen
Attorney, Agent, or Firm—Knobbe, Martens, Olson & Bear

[57] ABSTRACT

A control system for a multiple cylinder, direct fuel injected, spark ignited, internal combustion engine that protects the fuel injectors by precluding the possibility of firing of the spark plugs at a time when a fuel injector is open and if the kill switch has been turned on. The control circuit precludes the disabling of the ignition circuits until all fuel injectors of the engine are in their closed positions.

8 Claims, 8 Drawing Sheets

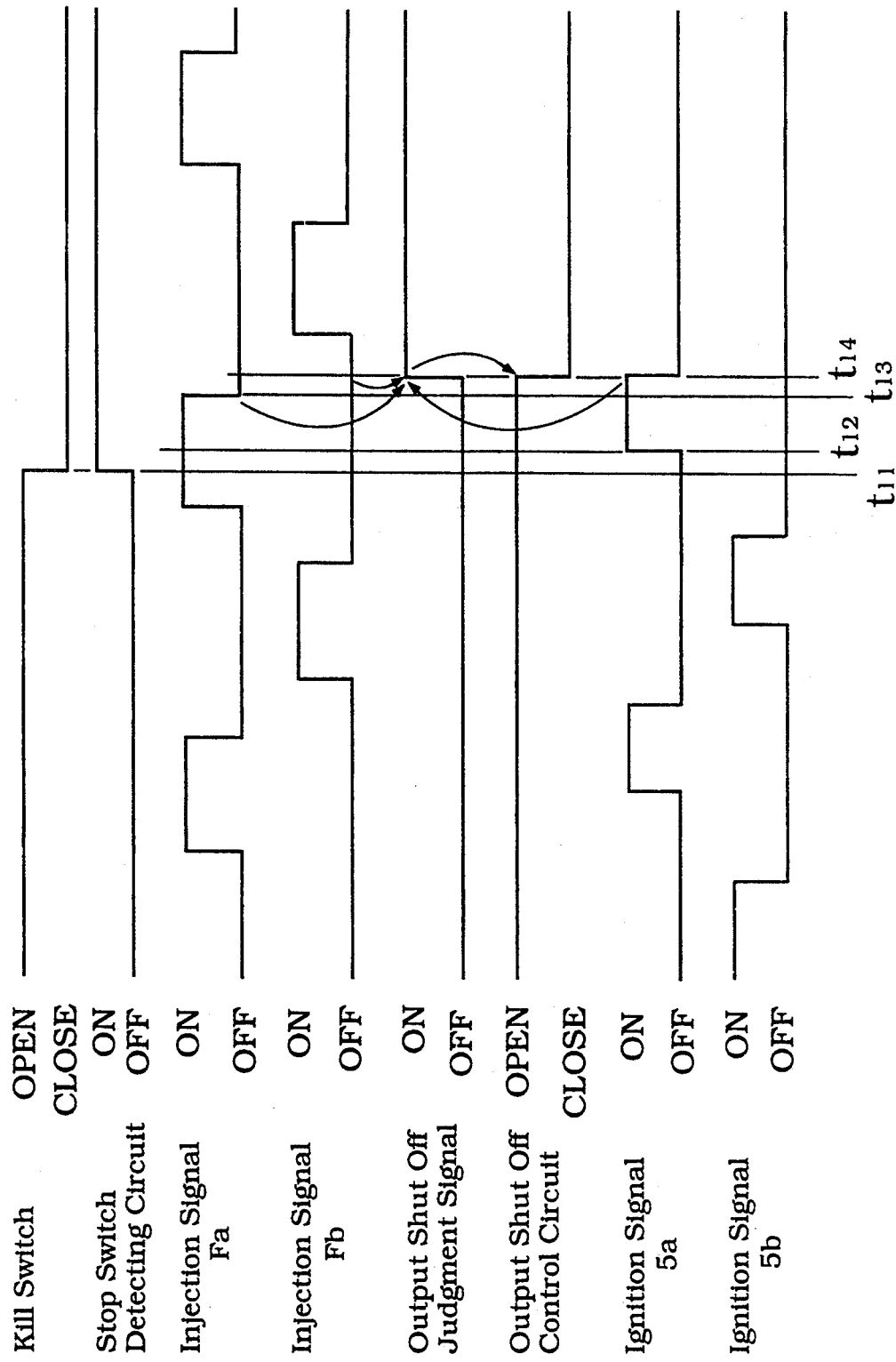

ENGINE STOP CONTROL DEVICE

BACKGROUND OF THE INVENTION

This invention relates to an engine stop control device and more particularly to improved method and apparatus for stopping a direct cylinder injected internal combustion engine.

The advantages of utilizing direct cylinder fuel injection for providing fuel economy and also more effective exhaust emission control are well known. However, direct cylinder fuel injection presents certain difficulties.

Specifically, since the fuel injector is positioned directly in the combustion chamber, it must be designed so as to withstand extremely high temperatures caused by the burning of the fuel in the combustion chamber. In addition, the fuel injector, which normally employs an injection valve that opens and closes to control the admission of fuel into the cylinder, can be prone to malfunctioning if deposits are formed on the valving surfaces or within the interior of the injector.

One particular condition when damage can occur to the fuel injector is when the engine is shut off. If the engine is switched off at a time when the injector valve is opened, there is a possibility that the spark plug may still fire and thus the combustion which will occur in the chamber occurs when the injector valve is opened. This can readily promote damage to the interior of the injector and the formation of carbon or other deposits either on the injector valve seating surfaces or within the body of the injector that can cause running difficulties when the engine is re-started.

This particular problem can be understood by reference to FIGS. 1 and 2 which are respectively, the timing diagram for a single cylinder of a two stroke, direct air/fuel injected internal combustion engine and a time diagram showing the condition of the passage of current through the spark coils and the kill switch of the engine.

Referring first to FIG. 1, this figure shows the timing conditions for a single cylinder of a two cylinder, two cycle, crankcase compression, internal combustion engine. Although the invention is described in conjunction with two stroke engines and engines having two cylinders, it should be readily apparent to those skilled in the art that the invention may be employed with four cycle direct cylinder injected engines and/or engine having any number of cylinders and any cylinder configuration. In fact, the invention also may be utilized in conjunction with rotary engines and the term "cylinder" as used in the specification and claims is intended to cover the combustion chamber regardless of how it is formed. The invention, however, has particular utility with two stroke or ported type rotary engines since they are more prone to the type of problem because of the overlap of the port opening and injection timing.

Referring now to FIG. 1, it will be seen that as the crankshaft rotates approximately past the 90° point, the exhaust port will open and after approximately 120° of rotation, the scavenge port will open. The scavenge port closes sometime at approximately 240° after top dead center and the exhaust port closes slightly before 270° after top dead center.

The timing diagram illustrates the condition for a fuel/air injector and one of the pre-charged type wherein fuel injection begins at approximately top dead center and continues into the injector chamber until about 150° after top dead center. At this time, the air pressure in the chamber of the air/fuel injector is maintained low and once fuel injection is completed, then the chamber is further pressurized with air. At approximately 190° after top dead center, the injector valve opens to permit the air and fuel to issue into the combustion chamber and the injector valve closes at approximately 270° after top dead center. The spark plug is fired at sometime before top dead center and after the injector valve has been closed in normal low speed, low load engine running.

The timing for the remaining cylinder is the same as that of the cylinder shown in FIG. 1 but in the actual engine, of course, the cylinders will fire at different times normally.

When the speed and load of the engine is higher than idle, the time of fuel injection is increased by the fuel injector and also the duration of opening of the injection valve is extended so that there will be some overlap between the time when the fuel injection valve is opened and the spark plug begins to fire. This presents a problem when shutting off the engine, because the mere initiated of the kill switch operation does not immediately stop the firing of the spark plugs as may be seen from FIG. 2 which shows the timing for both cylinders and the condition of the kill or ignition switch.

The top curves show the condition of the primary windings of the spark coils associated with the individual spark plugs and the next two curves show the firing condition of the associated spark plugs. It should be noted that the spark plug firing lags slightly the current flow through the primary winding of the spark coils so that the spark plugs fire slightly after current begins to flow through the primary winding of the coils and continues for a brief period of time after the primary winding is de-energized, as is well known.

Assuming the kill switch is turned off sometime $t_2$ after the spark plug associated with the number one cylinder has begun fire $t_1$, the spark plug firing will continue for a time period up until the time period $t_3$ due to the fact that there is this lag between the de-energization of the primary winding and the actual shutting off of the engine. Because of the fact that the spark is still firing and the fuel injection valve may be opened, then obviously damage can occur to the fuel injector and at the minimum, there will be combustion chamber deposits form in the chamber of the fuel injector which can cause the fuel injector to malfunction with the engine is next started.

It is, therefore, a principle object to this invention to provide an improved control for the stopping of an engine which insures that the spark plug firing will be discontinued only after it is insured that the actuating signal for the injection valve has been turned off.

It is a further object to this invention to provide an interrelated control for the injector valve and ignition circuit of an engine that insures that the injector valve is deactivated before firing of the spark plugs is terminated.

SUMMARY OF THE INVENTION

This invention is adapted to be embodied in a fuel injected, spark ignited, internal combustion engine having a cylinder, and a fuel injector for injecting fuel into said cylinder and which has an injection valve operable between an opened and a closed position. A spark plug is provided for firing a charge in the cylinder and is fired by an ignition circuit. A kill switch is provided for disabling the ignition circuit for stopping the engine.

In accordance with an apparatus for practicing the invention, control means preclude stopping of the ignition until after the injector valve is closed.

In accordance with a method for practicing the invention, the ignition circuit is not disabled until after the injector valve is closed.

BRIEF DESCRIPTION OF THE DRAWINGS

FIG. 8 is a diagram showing the state of the various controls of the engine during a shut-off mode in accordance with the invention.

DETAILED DESCRIPTION OF THE PREFERRED EMBODIMENT OF THE INVENTION

Figure 1:
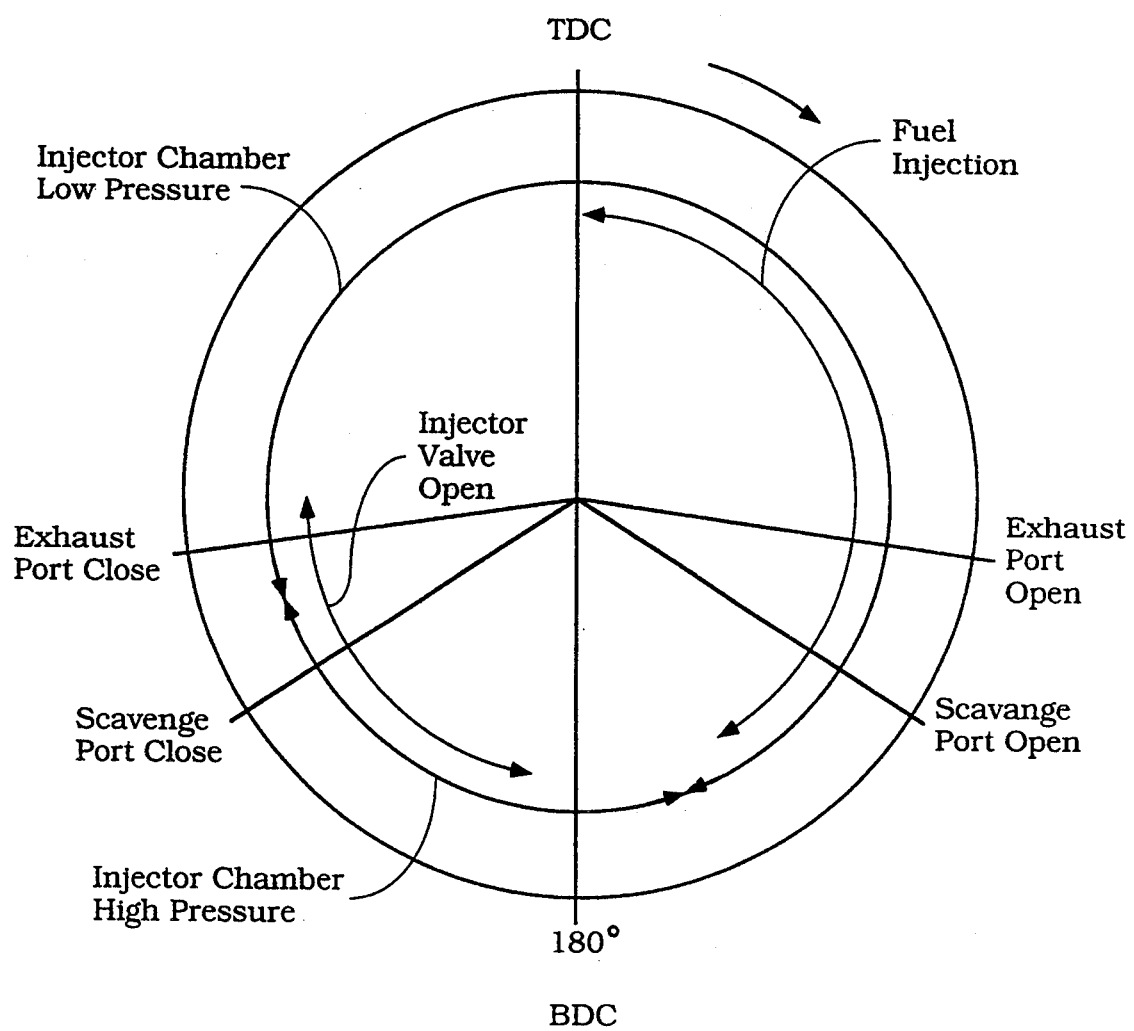
FIG. 1 is a timing diagram for the events of a single cylinder of a two cylinder, two stroke, crankcase compression engine constructed and operated in accordance with this invention.
Figure 2:
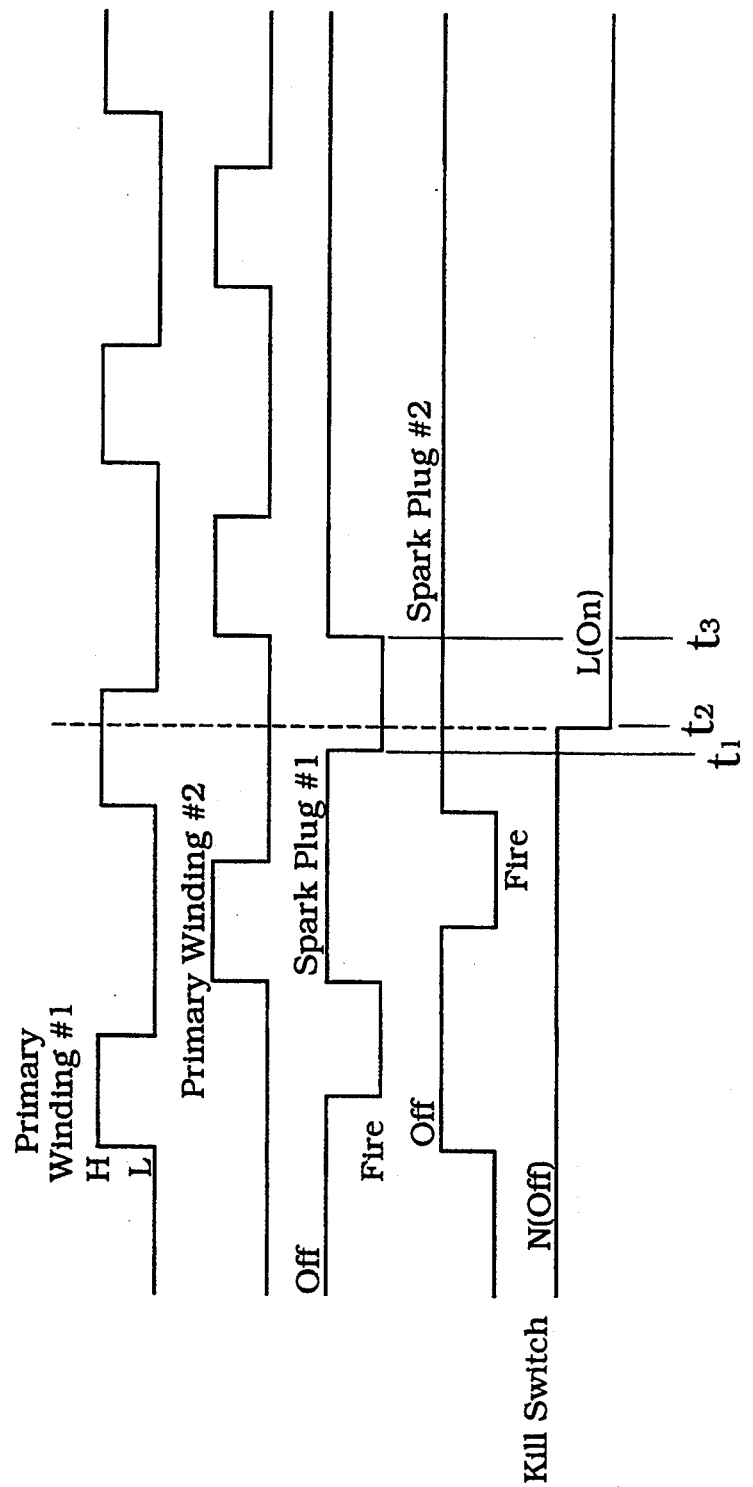
FIG. 2 is a timing diagram showing the current flow through the primary windings and spark plugs of a two cycle, crankcase compression, internal combustion engine and the condition of a kill switch of a prior art type of engine so as to show the condition of operation of the prior art type of construction.
Figure 3:
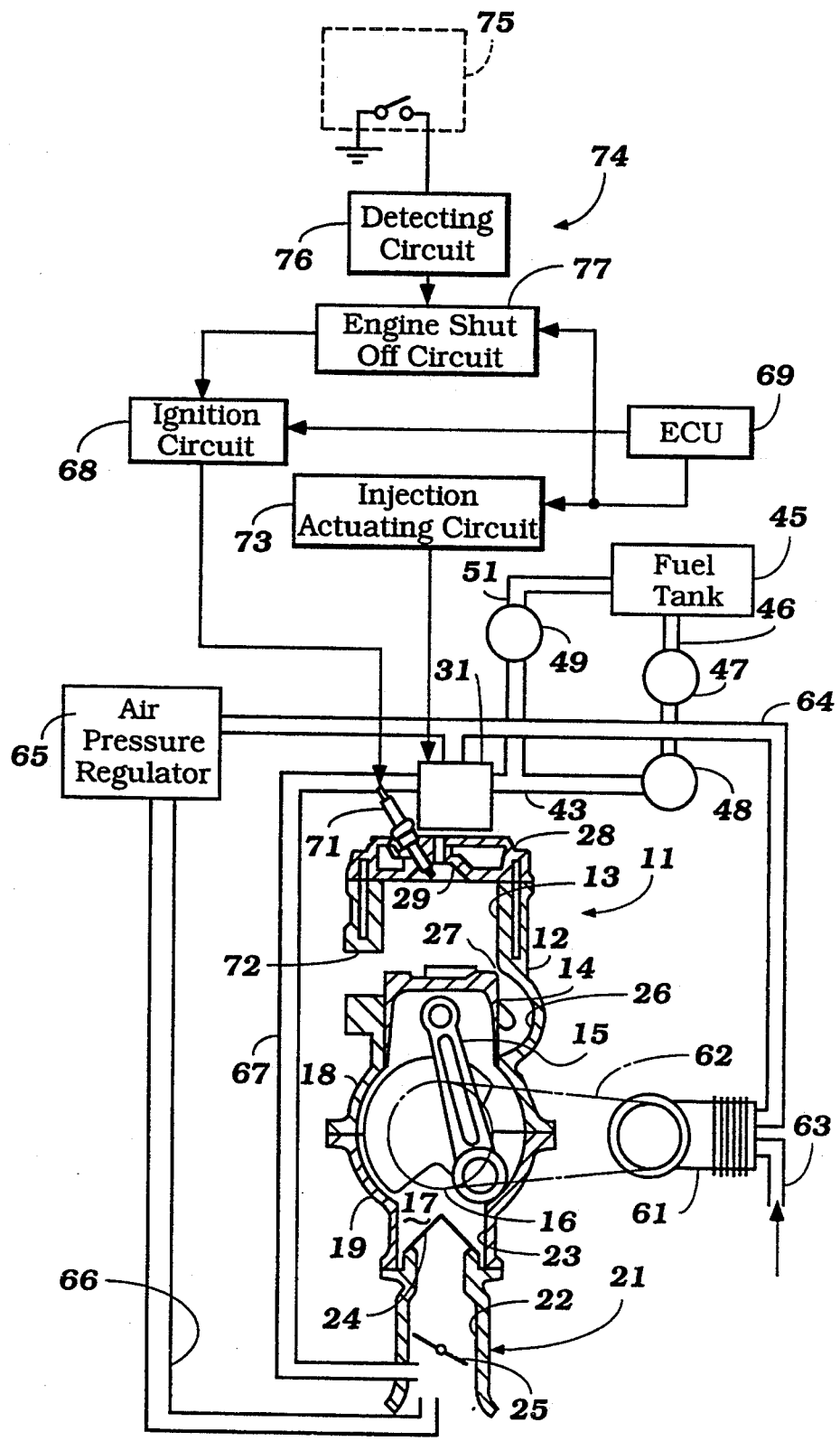
FIG. 3 is a partially schematic cross sectional view taken through a single cylinder of a two cylinder, two stroke, crankcase compression, internal combustion engine constructed and operated in accordance with an embodiment of the invention.

Referring first to FIG. 1, a two cylinder, two cycle, crankcase compression, internal combustion engine constructed and operated in accordance with an embodiment of the invention is identified generally by the reference numeral 11. In FIG. 3, only a single cylinder of the engine is depicted because it is believed that those skilled in the art can readily understand how the invention is applied to the remaining cylinder or cylinders if the engine has more than two cylinders.

The engine 11 is comprised of a cylinder block 12 having two cylinder bores, only one of which appears in FIG. 3, and is identified by the reference numeral 13. A piston 14 reciprocates within each cylinder bore 13 and is connected by means of a respective connecting rod 15 to a crankshaft 16. The crankshaft 16 rotates within a crankcase chamber 17 formed by a skirt 18 of the cylinder block 12 and a crankcase member 19 that is affixed to the cylinder block 12 in a known manner. As is typical with two cycle, crankcase compression engine practice, the crankcase chambers 17 associated with the cylinder bores 13 are sealed from each other in an appropriate manner.

A system is provided for delivering an air charge to the crankcase chamber 17 and this includes an induction manifold, indicating generally by the reference numeral 21 which has individual runners 22 that extend to intake ports 23 formed in the crankcase member 19. Reed type check valves 24 are provided in the intake ports 23 for permitting air to flow into the crankcase chamber 17, but for precluding reverse flow when the charge is being compressed therein by downward movement of the pistons 14. A throttle valve 25 is provided in the intake passages 22 for controlling the speed of the engine 11, as is well known.

The air charge which is compressed in the crankcase chamber 17 is transferred to the area above the pistons 14 through one or more scavenge passages 26 that are formed in the cylinder block 12 and which terminate in respective scavenge ports 27 which are opened and closed by the movement of the pistons 14 in a sequence as shown in FIG. 1.

Figure 4:
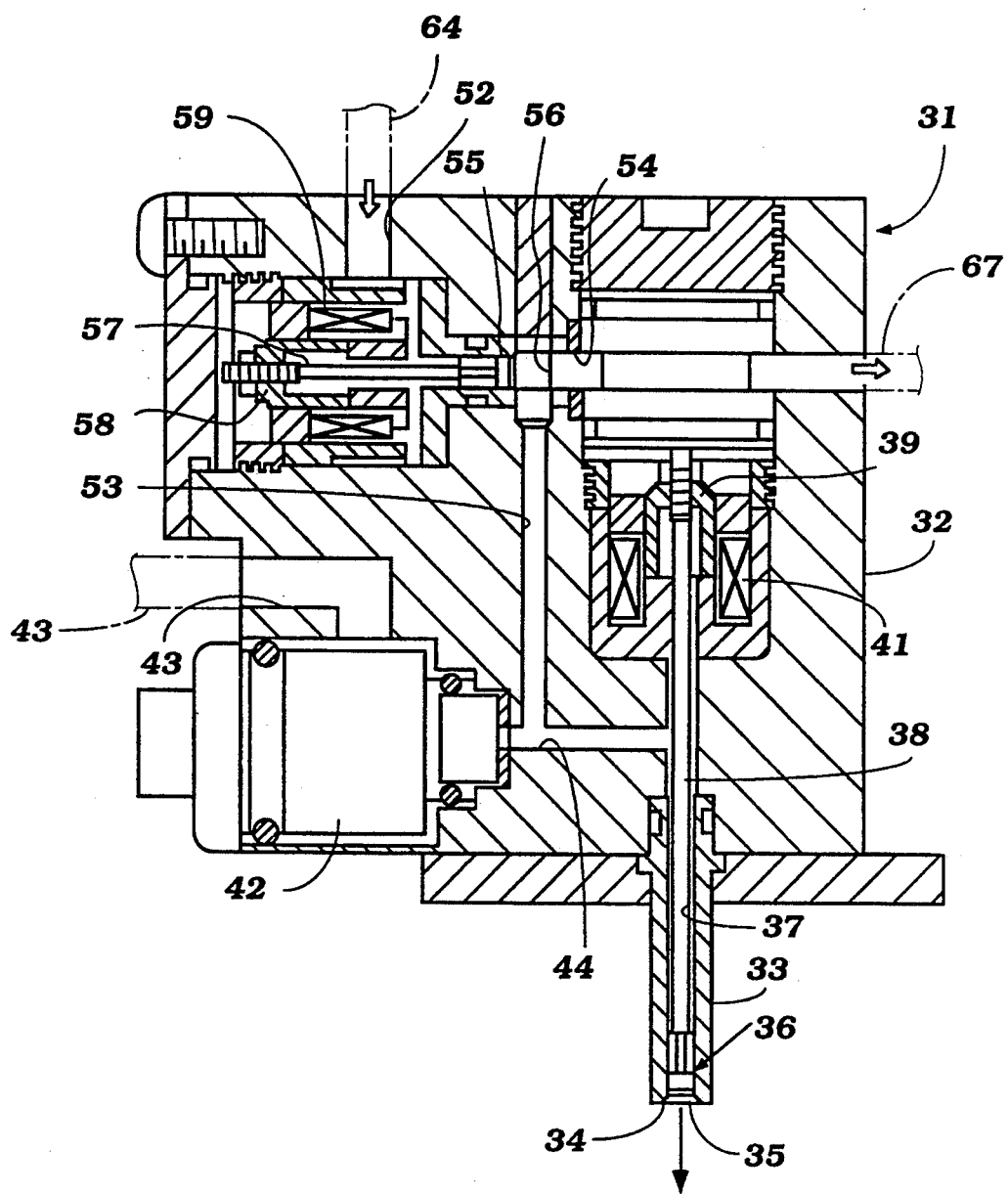
FIG. 4 is an enlarged cross sectional view taken through the air/fuel injector of one cylinder of the engine.

A cylinder head assembly 28 is affixed to the cylinder block 12 and has recesses 29 which cooperate with the piston 14 and cylinder bore 13 to form the combustion chambers of the engine. An air/fuel charge is delivered to the combustion chambers by an air/fuel injector assembly, indicated generally by the reference numeral 31 and which has a construction as best shown in FIG. 4. It is to be understood that although the invention is described in conjunction with an air/fuel injection system, the invention may be equally well practiced with engines that have pure fuel injectors.

The air/fuel injector 31 includes an outer housing assembly 32 having a nozzle part 33 that is adapted to be affixed to the cylinder head 28 in any suitable manner with an injector port 34 communicating directly with the combustion chamber recess 29. The injector port 34 also provides a valve seat that is opened and closed by the head portion 35 of an injector valve, indicated generally by the reference numeral 36 which controls the communication of a chamber 37 with the combustion chamber.

The injector valve 36 has a reduced diameter portion 38 that is connected to an armature 39 which is encircled by a solenoid winding 41. The injector valve 38 is normally urged to its closed position by a control spring (not shown) and when the winding 41 is energized, in a manner which will be described, the injector valve 36 moves to an opened position so as to permit a fuel/air charge from the chamber 37 to be admitted to the combustion chamber recess 29 in the timing routine as shown in FIG. 1.

Fuel is supplied to the chamber 39 by means of a fuel injector 42 that is mounted to the body portion 32 in any known manner and which has a solenoid winding that is controlled also in a manner to be described, so as to spray fuel that is delivered through a fuel conduit 43 into a passage 44 in the injector body 32 that intersects the chamber 37 for the supply of fuel thereto.

Referring again to FIG. 1, the system for supplying fuel to the injector passage 43 is illustrated and will be described. This fuel supply system includes a fuel tank 45 which is remotely positioned and which delivers fuel through a conduit 46 in which a filter 47 is positioned to a fuel pump 48. The fuel pump 48 may be driven by the engine or electrically powered and delivers fuel to the conduit 43 of the air/fuel injector 31. A pressure regulator 49 is provided in a bypass conduit 51 and regulates the pressure of the fuel supplied to the fuel injectors 42 of the air/fuel injector 31 by bypassing excess fuel back to the fuel tank 45 through this conduit 51.

Referring again to FIG. 4, high pressure air at a regulated pressure is delivered, in a manner to be described, to an air inlet port 52 of the injector housing 32. This high pressure air is delivered to a conduit 53 that communicates with the conduit 44 and chamber 37 and at times to a return conduit 54. The opening and closing of the delivery of air to the return conduit 54 is controlled by an air control valve 55 that opens and closes a port 56 that communicates with the conduit 54. The air control valve 55 has a stem portion 57 that is connected to an armature 58 that is surrounded by a solenoid winding 59. A spring (not shown) normally maintains the air control valve 55 in an open bypassing condition so that some air will be bypassed through the conduit 54 and the air pressure in the chamber 37 will be low. However, when the winding 59 is energized, the air control valve 55 will close the port 56 and higher pressure air will then be delivered through the passage 53 and conduit 44 to the chamber 37. These high and low pressure stages are also shown in the timing diagram of FIG. 1.

The system for supplying regulated air pressure to the injector air port 52 will now be described by reference to FIG. 3. It will be noted that there is provided an air compressor 61 that is driven from the engine crankshaft 16 by means of a belt or the like 62 and which draws atmospheric air through an inlet conduit 63. The air compressor 61 discharges high pressure air through an air delivery port and manifold 64 which communicates with the intake air ports 52 of the air/fuel injectors 31. In addition, the passage 64 extends to an air pressure regulator 65 that regulates the air pressure delivered to the air inlet ports of the air fuel injectors 31 by bypassing excess air through a conduit 66 back to the air inlet of the manifolds 21. In a similar manner, the air conduit 54 communicates with a further conduit 67 which also will return the air back to the intake manifold 21 under the times when the air valve port 56 is opened.

Continuing to refer to FIG. 3, the controls for the engine 11 are shown in part schematically and these include an ignition circuit, indicated generally by the reference numeral 68 which is controlled by an ECU 69 so as to fire spark plugs 71 that are mounted in the cylinder head 28 for firing the charge which is delivered to the combustion chamber from the air/fuel injector 31 and from the scavenge ports 27. This charge then burns and expands and drives the piston 14 downwardly until an exhaust port 72 formed in the cylinder block 12 is opened so that the exhaust gases may be discharged through an exhaust system (not shown) which may be of any type. The timing of the opening of the exhaust port 72 is also as shown in FIG. 1.

The ECU 69 also controls an injection actuating circuit 73 which outputs signals to the air/fuel injector 31 for selectively actuating the fuel injector 42, injection valve solenoid winding 41 and air control valve solenoid winding 59 through any desired control strategy. For the normal control of fuel injection by the injection actuating circuit 73 and of the firing of the spark plugs 71 by the ignition circuit 68, the ECU 69 may receive control signals from any of a plurality of sensors including engine speed control, air flow control, and ambient conditions. Since this construction forms no part of the invention, further description of it is believed to be unnecessary.

The invention deals in the way in which the engine is shut off. This includes an engine stop control circuit, which is indicated generally by the reference numeral 74 and which includes a stop or kill switch 75. It should be noted that the engine 11 is provided with a magneto generator and as such, there is not normally an ignition switch that is turned on or off to control the running or stopping of the engine. Although the invention is described in conjunction with an engine having a kill switch 75, it is to be understood and those skilled in the art will readily understand how the invention can be applied to engines having ignition switches. However, the invention has particular utility in conjunction with magneto operated engines since as the engine continues to turn even though the kill switch has been disabled, electrical power will be generated in certain of the circuits until the rotation of the engine stops.

The kill switch 75 is connected to a detecting circuit 76 which detects certain characteristics as will be described and specifically the condition of the kill switch 75. This detecting circuit 76 then outputs a signal to an engine shut-off circuit 77 which operates to control both the ignition circuit 68 and injection actuating circuit 73 to shut down these circuits in a manner which will be described.

Figure 5:
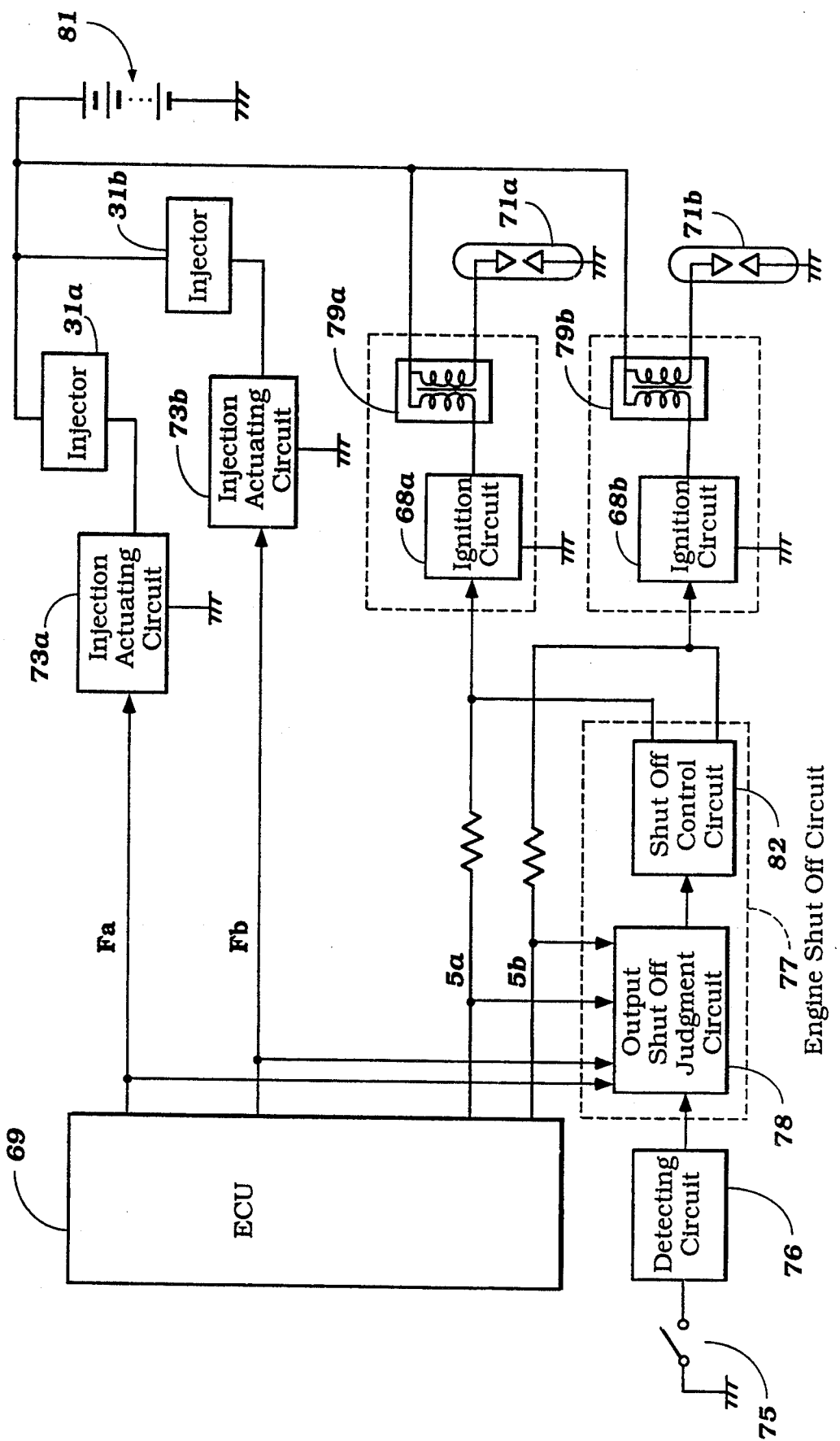
FIG. 5 is a schematic diagram of the control circuit.
Figure 6:
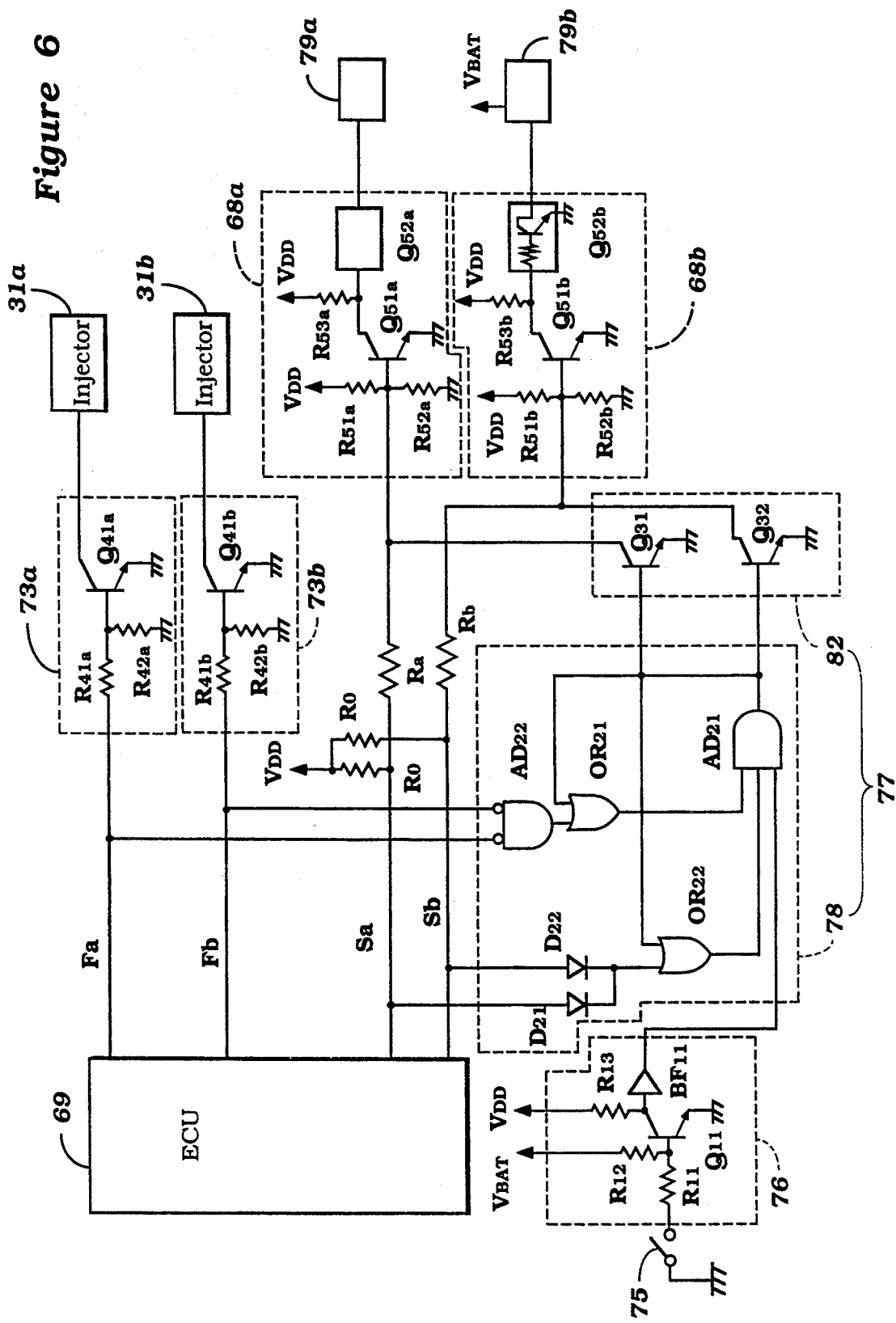
FIG. 6 is a more detailed electrical diagram of the actual electrical circuit.

The detecting circuit 76 and engine shut-off circuit 77 as well as the total engine stop control circuit 74 are shown in more detail in both FIGS. 5 and 6 and will now be described in more detail with respect to those figures so as to show how they are interrelated with the spark plug 71 and ignition control circuit 68 and air/fuel injectors 31 and injection actuating circuit 73. FIG. 5, which is a more generalized showing will be described first.

It will be seen here that the engine shut-off circuit 77 actually includes an output shut-off judgement circuit 78 which receives signals from the detecting circuit 76 that detects the condition of the kill switch 75 and which receives signals Fa and Fb transmitted from the ECU 69 to the injection actuating circuits 77a and 77b associated with the air/fuel injectors 31a and 31b. In addition, the output shut-off judgement circuit 78 receives ignition signals Sa and Sb which are transmitted from the ECU 69 to the respective ignition circuits 68a and 68b for firing of the spark plugs 71a and 71b, respectively. These ignition circuits 68a and 68b energize the primary winding of ignition coils 79a and 79b associated with the spark plugs 71a and 71b as previously noted. The system is also supplied with electrical power from a battery 81.

When the output shut-off judgement circuit 78 determines that the engine 11 may be shut down because both of the injectors valves are closed, it then actuates an engine shut-off circuit 82 which will terminate the output signals to the ignition circuit 68a and 68b from the ECU 69 (signals Sa and Sb terminated) so as to stop the engine.

The circuit will now be described in more detail by reference to FIG. 6 where the actual electrical components of the circuit are illustrated. The detector circuit 76 which senses the condition of the kill switch 75 includes a transistor $Q_{11}$ which receives when the kill switch 75 is closed or switched on a voltage signal from a voltage divider circuit consisting of resistors $R_{12}$ and $R_{11}$ from the battery so as to render the transistor conductive and output a signal through a diode $BF_{11}$ to on terminal of AND gate $AD_{21}$. The AND gate 21 forms a portion the output shut-off judgement circuit 78 which also includes an OR circuit $OR_{22}$ which has one of its terminals receiving the signals Sa and Sb from the ECU 69 through respective diodes $D_{21}$ and $D_{22}$ so as to activate the one terminal of the or circuit $OR_{22}$ when no signal is being given to either of the two ignition control circuits 68a and 68b that energized the spark coils 79a and 79b to fire the spark plugs 71a and 71b, respectively. The final terminal of the an circuit $AD_{21}$ is connected to a further OR circuit $OR_{21}$ of the output shut-off judgement circuit 78. This OR circuit $OR_{21}$ has one of its terminal connected to an AND circuit $AD_{22}$ of the shut-off judgement circuit. The AND circuit $AD_{22}$ receives signals Fa and Fb from the ECU 69 and hence the respective terminal of the OR circuit $OR_{21}$ will not be energized until both of the fuel injectors 31a and 31b are not receiving inject signals Fa and Fb from the ECU 69.

Referring now to the injector control circuits 73a and 73b, as aforenoted, these are both energized by signals Fa and Fb from the ECU 69. These signals are transmitted to respective voltage divider circuits including resistors $R_{41}$ and $R_{42}$ so as to switch on the gates of resistors $Q_{41}$ and render them conductive so as to energize the solenoids 41 of the fuel injectors 31 to cause fuel injection in the matter as aforedescribed.

The ignition control circuits 68a and 68b will now also be described by reference to FIG. 6. As noted, the ECU 69 sends out spark control signals Sa and Sb which are connected through respective voltage divider circuits including resistors Ro and Ra and Rb, respectively, to a further voltage divider circuit consisting of resistors $R_{51}$ and $R_{52}$ so as to switch the gates of respective transistors $Q_{51}$ which, in turn, switch further transistors $Q_{52}$ to energize the spark coils 79a and 79b when the signals Sa and Sb are transmitted. The shut-off circuit 82 acts to shut off the ignition by shorting to ground the signals Sa and Sb through respective transistors $Q_{31}$ and $Q_{32}$ which have their gates switched on by the AND circuit $AD_{21}$ of the output shut-off judgement circuit 78 when the AND circuit receives signals from the kill switch detecting circuit 76 and the OR circuits $OR_{21}$ and $OR_{22}$. These OR circuits will not be generated unless the fuel injectors 31a and 31b are not receiving actuation signals Fa and Fb from the ECU 69 so that the engine cannot be shut off until both injector valves 36 of the fuel injectors 31 are shut off.

Figure 7:
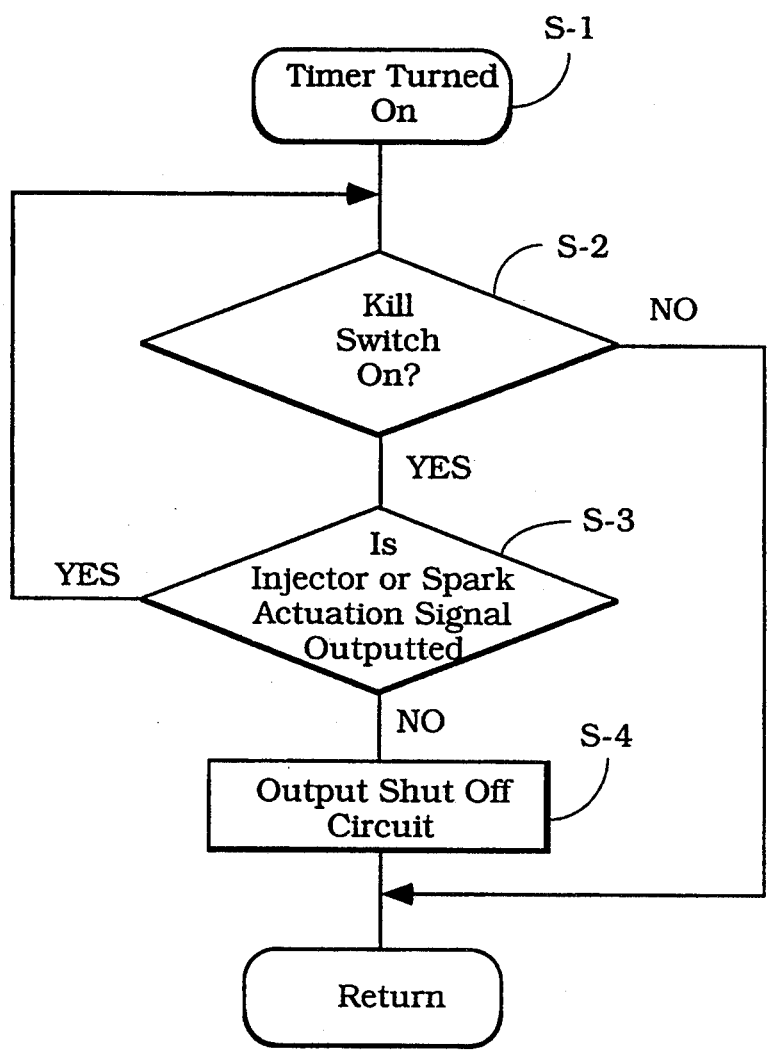
FIG. 7 is a block diagram showing the control routine.

This control routine is depicted in FIG. 7 as a block a diagram of the logic of operation. As may be seen in this diagram, control routine can be best understood by also referring to FIG. 8 in addition to FIG. 7. FIG. 8 shows the condition of the kill switch, ignition signals, injection signals, stop switch detecting circuit, output shut-off judgement circuit and output shut-off control circuits, respectively. When the kill switch 75 is closed a timer circuit is begun to run at the time $t_{11}$ and at the step S-1. The program then moves to the step S-2 to determine if the kill switch 75 is still on and if it is not, the program returns.

However, if at the step S-2 it is determined that the kill switch is still on, the program moves to the step S-3 to determine if there is an injection signal being generated by either of the outputs Fa or Fb. In this particular instance, it should be noted from FIG. 8 that at the time $t_{11}$ there is being outputted an injector signal Fa for the fuel injector 31a. Hence, this causes the program to repeat back to the step S-2. At the time $t_{12}$ it should be noted that an ignition signal for firing one of the spark plugs 71 (spark plug 71a) ignition signal Sa begins at the time $t_{12}$ and hence, there is still an output signal generated so that the AND gate $AD_{21}$ cannot be switched on since neither the OR gate $OR_{22}$ nor the or gate $OR_{21}$ will be turned on.

At the time $t_{13}$ the fuel injection signal Fa is now turned off and there is no fuel injection signal Fb. Hence, the OR gate $OR_{21}$ can be turned on. However, the OR gate $OR_{22}$ will still be turned off because there is an ignition circuit signal Sa still present. At the time $t_{14}$, however, the ignition signal Sa is shut off and there is no longer a signal from either injector Fa or Fb and no ignition signal Sa and Sb. Hence, at the time $t_{14}$ the output shut-off judgement circuit 78 now becomes conductive because the AND gate $AD_{21a}$ will be switched on and the shut-off control circuit can then be switched on at the step S-4 so at to shut off the ignition circuit by grounding the signal Sa and Sb from the ECU 69 and the engine will be stopped.

It should be readily apparent from the foregoing description that the described embodiment of the invention is very effective in protecting fuel injectors from damage due to firing of the spark plugs after the kill switch has been opened and at a time when the fuel injection valve is opened since the engine cannot be shut off until all of the fuel injectors are deactivated and there is no spark signal occurring. Of course, the foregoing description is that of a preferred embodiment of the invention and various changes and modifications may be made without departing from the spirit and scope of the invention as defined by the appended claims.

We claim:

1. A fuel injected, spark ignited, internal combustion engine having a cylinder, a fuel injector for injecting fuel into said cylinder and having an injection valve operable between an opened position and a closed position, a spark plug for firing a charge in said cylinder, an ignition circuit for firing said spark plug, a kill switch for disabling said ignition circuit for stopping said engine, and control means for precluding the disabling of said ignition circuit when said kill switch is closed until said injection valve is closed.

2. A fuel injected, spark ignited, internal combustion engine as set forth in claim 1 wherein the control means further precludes disabling of the ignition circuit at a time when the ignition circuit is also receiving a signal to fire the spark plug.

3. A fuel injected, spark ignited, internal combustion engine as set forth in claim 1 wherein the engine is provided with multiple cylinders, multiple fuel injectors and multiple spark plugs and the disabling of the ignition circuits for all of the spark plugs is delayed upon actuation of the kill switch until all of the injections valves are in their closed positions.

4. A fuel injected, spark ignited, internal combustion engine as set forth in claim 3 wherein the control means further precludes disabling of the ignition circuit at a time when the ignition circuit is also receiving a signal to fire one of the spark plugs.

5. A method of operating a fuel injected, spark ignited, internal combustion engine having a cylinder, a fuel injector for injecting fuel into said cylinder and having an injection valve operable between an opened position and a closed position, a spark plug for firing a charge in said cylinder, an ignition circuit for firing said spark plug, a kill switch for disabling said ignition circuit for stopping said engine, said method comprising steps of precluding the disabling of said ignition circuit when said kill switch is closed until said injection valve is closed.

6. A method as set forth in claim 5 wherein the method further precludes disabling of the ignition circuit at a time when the ignition circuit is also receiving a signal to fire the spark plug.

7. A method as set forth in claim 5 wherein the engine is provided with multiple cylinders, multiple fuel injectors and multiple spark plugs and the disabling of the ignition circuits for all of the spark plugs is delayed upon actuation of the kill switch until all of the injections valves are in their closed positions.

8. A method as set forth in claim 7 wherein the control means further precludes disabling of the ignition circuit at a time when the ignition circuit is also receiving a signal to fire one of the spark plugs.

* * * * *